US012713242B2

(12) United States Patent
Kim et al.

(10) Patent No.: US 12,713,242 B2
(45) Date of Patent: Aug. 18, 2026

(54) APPARATUS AND METHOD FOR CONTROLLING AUTONOMOUS DRIVING OF A VEHICLE

(71) Applicants: HYUNDAI MOTOR COMPANY, Seoul (KR); KIA CORPORATION, Seoul (KR)

(72) Inventors: Dae Hyun Kim, Hwaseong-si (KR); Ho Jun Seong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 176 days.

(21) Appl. No.: 18/887,543

(22) Filed: Sep. 17, 2024

(65) Prior Publication Data

US 2025/0330815 A1 Oct. 23, 2025

(30) Foreign Application Priority Data

Apr. 17, 2024 (KR) ........................ 10-2024-0051533

(51) Int. Cl.

*H04W 12/106* (2021.01)
*B60W 50/00* (2006.01)
*B60W 60/00* (2020.01)

(52) U.S. Cl.

CPC ........ *H04W 12/106* (2021.01); *B60W 60/001* (2020.02); *B60W 2050/0043* (2013.01)

(58) Field of Classification Search

CPC ............. H04W 12/106; H04L 63/0876; H04L 63/0428; H04L 63/12; H04L 2209/84; B60W 2050/0043; B60W 60/001; B60W 50/045; B60R 16/023

See application file for complete search history.

(56) References Cited

U.S. PATENT DOCUMENTS

| | | | |
|---|---|---|---|
| 9,725,073 | B2 | 8/2017 | Haga |
| 9,902,370 | B2 | 2/2018 | Haga |
| 10,137,862 | B2 | 11/2018 | Haga |
| 10,992,688 | B2 | 4/2021 | Kishikawa |

(Continued)

FOREIGN PATENT DOCUMENTS

| | | | |
|---|---|---|---|
| JP | 6407981 | B2 | 10/2018 |
| JP | 6684690 | B2 | 4/2020 |
| KR | 101721035 | B1 | 3/2017 |

*Primary Examiner* — Thomas Ingram

(74) *Attorney, Agent, or Firm* — Lempia Summerfield Katz LLC

(57) ABSTRACT

An autonomous driving control apparatus includes a memory that stores computer-executable instructions, and at least one processor that executes the instructions by accessing the memory. The at least one processor identifies a first target signal determined from a vehicle control device based on a message authentication code (MAC) generation table predetermined by an autonomous driving signal. The at least one processor determines a MAC generation command for the first target signal by identifying a second target signal. The second target signal includes an identification code of the first target signal and includes data different from data of the first target signal. The at least one processor controls a vehicle including the vehicle control device by determining whether the second target signal is a signal of the vehicle control device, based on a target code determined by the MAC generation command.

20 Claims, 8 Drawing Sheets

(56) References Cited

U.S. PATENT DOCUMENTS

| | | | | |
|---|---|---|---|---|
| 11,110,895 | B2 | 9/2021 | Maluf | |
| 11,535,267 | B2 | 12/2022 | Meng | |
| 11,641,367 | B2 | 5/2023 | Sloan | |
| 11,757,851 | B2 * | 9/2023 | Troia | H04L 63/0428 701/27 |
| 2016/0297401 | A1 * | 10/2016 | Haga | H04L 9/0891 |
| 2017/0361808 | A1 | 12/2017 | Haga | |
| 2018/0126954 | A1 | 5/2018 | Haga | |
| 2018/0302422 | A1 * | 10/2018 | Kishikawa | H04L 9/3271 |
| 2020/0195445 | A1 * | 6/2020 | Zhang | H04W 12/108 |
| 2021/0300408 | A1 * | 9/2021 | Fujimoto | B60W 60/001 |
| 2023/0214483 | A1 * | 7/2023 | Ujiie | H04L 12/28 |

* cited by examiner

700

| VEHICLE CONTROL DEVICE | IDENTIFICATION CODE | AUTONOMOUS DRIVING SIGNAL | MAC GROUP |
|---|---|---|---|
| ECU1 | CAN ID #1 | O | O |
| ECU2 | CAN ID #2 | O | O |
| | CAN ID #3 | x | x |
| ECU3 | CAN ID #4 | O | O |
| ECU4 | CAN ID #5 | x | x |
| | CAN ID #6 | x | x |

APPARATUS AND METHOD FOR CONTROLLING AUTONOMOUS DRIVING OF A VEHICLE

CROSS-REFERENCE TO RELATED APPLICATION

This application claims the benefit of and priority to Korean Patent Application No. 10-2024-0051533, filed in the Korean Intellectual Property Office on Apr. 17, 2024, the entire contents of which are incorporated herein by reference.

TECHNICAL FIELD

The present disclosure relates to an autonomous driving control apparatus and a control method thereof. More particularly, the present disclosure relates to a technology for controlling a vehicle based on controller area network (CAN) intrusion detection system (IDS) and message authentication code (MAC) authentication.

BACKGROUND

A conventional vehicle control method performs an operation of storing a record of an input signal when the signal suspected of is hacking input to a vehicle. Alternatively, a conventional vehicle control method performs an operation of determining whether the input signal is normal after the input signal is analyzed through a server.

When the input signal is an abnormal signal, the above-mentioned method performs an operation of storing the input signal in a non-volatile memory area or an operation of transmitting a log value to the server. For this reason, this wastes resources of an embedded system included in the vehicle or increases data costs.

Additionally, when applying MAC to each signal suspected of being hacked in the vehicle, the above-described method increases the amount of computation for each control device included in the vehicle.

To address these challenges, it is necessary to develop a technology for determining whether the input signal is normal, based on a predetermined MAC generation table. The subject matter described in this background section is intended to promote an understanding of the background of the disclosure and thus may include subject matter that is not already known to those of ordinary skill in the art.

SUMMARY

The present disclosure was made to solve the above-mentioned problems occurring in the prior art while advantages achieved by the prior art are maintained intact.

An aspect of the present disclosure provides an autonomous driving control apparatus. The autonomous driving control apparatus may reduce the amount of computation of control devices that apply message authentication code (MAC) to a signal by identifying a target signal determined from a vehicle control device based on an MAC generation table predetermined by an autonomous driving signal. The present disclosure also provides a control method thereof.

Moreover, an aspect of the present disclosure provides an autonomous driving control apparatus. The autonomous driving control apparatus may increase the accuracy of determination about abnormalities of a vehicle by determining a MAC generation command for the target signal based on identifying an external signal. The external signal includes an identification code of the target signal and includes data different from data of the target signal. The present disclosure also provides a control method thereof.

Furthermore, an aspect of the present disclosure provides an autonomous driving control apparatus. The autonomous driving control apparatus may increase the communication security of a vehicle performing autonomous driving by controlling a vehicle including a vehicle control device by determining whether the external signal is a signal of the vehicle control device, based on a target code determined by the MAC generation command. The present disclosure also provides a control method thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, an autonomous driving control apparatus may include a memory that stores computer-executable instructions and may include at least one processor that executes the instructions by accessing the memory. The at least one processor may identify a first target signal determined from a vehicle control device based on code message authentication (MAC) generation table a predetermined by an autonomous driving signal. The at least one processor may determine a MAC generation command for the first target signal by identifying a second target signal. The second target signal includes an identification code of the first target signal and includes data different from data of the first target signal. The at least one processor may control a vehicle including the vehicle control device by determining whether the second target signal is a signal of the vehicle control device, based on a target code determined by the MAC generation command.

In an embodiment, the at least one processor may determine whether the first target signal is the autonomous driving signal, by applying the first target signal to the MAC generation table. The at least one processor may identify the second target signal based on the first target signal being the autonomous driving signal. The at least one processor may stop identifying the second target signal based on the first target signal being a different signal from the autonomous driving signal.

In an embodiment, the at least one processor may determine that the second target signal includes data different from data of the first target signal, based on at least one of periodicity of the second target signal, a length of the second target signal, a field value range of the second target signal, or any combination thereof.

In an embodiment, the at least one processor may identify permission for MAC generation of the first target signal from the MAC generation table after identifying the second target signal. The at least one processor may transmit the MAC generation command to the vehicle control device, based on the permission for MAC generation.

In an embodiment, the at least one processor may broadcast the MAC generation command to a vehicle network including the vehicle control device.

In an embodiment, the at least one processor may determine the MAC generation command based on at least one of a first series code including the identification code of the first target signal, a second series code including an index for determining the target code, a third series code including information about activation of the target code, or any combination thereof.

In an embodiment, the at least one processor may identify a data code other than the identification code of the first target signal from the first target signal. The at least one processor may obtain a first authentication code, in which the data code of the first target signal is encrypted, by applying the data code and a predetermined secret key to a model trained to output information for authentication of input data. The at least one processor may determine the target code from the first authentication code based on the index included in the second series code.

In an embodiment, the at least one processor may identify a data code other than an identification code of the second target signal from the second target signal. The at least one processor may obtain a second authentication code, in which the data code of the second target signal is encrypted, by applying the data code and the predetermined secret key to the trained model. The at least one processor may determine a temporary code from the second authentication code based on the index included in the second series code. The at least one processor may determine whether the second target signal is the signal of the vehicle control device, based on comparison between the target code and the temporary code.

In an embodiment, the at least one processor may receive the first target signal, to which the target code is combined, from the vehicle control device.

In an embodiment, the at least one processor may determine a MAC stop command for the first target signal based on ignition of the vehicle being deactivated.

According to an aspect of the present disclosure, an autonomous driving control method may include identifying a first target signal determined from a vehicle control device based on a message authentication code (MAC) generation table predetermined by an autonomous driving signal. The autonomous driving control method may include determining a MAC generation command for the first target signal by identifying a second target signal. The second target signal includes an identification code of the first target signal and includes data different from data of the first target signal. The autonomous driving control method may include controlling a vehicle including the vehicle control device by determining whether the second target signal is a signal of the vehicle control device, based on a target code determined by the MAC generation command.

In an embodiment, controlling the vehicle may include determining whether the first target signal is the autonomous driving signal, by applying the first target signal to the MAC generation table. Controlling the vehicle may include identifying the second target signal based on the first target signal being the autonomous driving signal. Controlling the vehicle may include stopping identifying the second target signal based on the first target signal being a different signal from the autonomous driving signal.

In an embodiment, controlling the vehicle may include determining that the second target signal includes data different from data of the first target signal, based on at least one of periodicity of the second target signal, a length of the second target signal, a field value range of the second target signal, or any combination thereof.

In an embodiment, controlling the vehicle may include identifying permission for MAC generation of the first target signal from the MAC generation table after identifying the second target Controlling the vehicle may include transmitting the MAC generation command to the vehicle control device, based on the permission for MAC generation.

In an embodiment, controlling the vehicle may include broadcasting the MAC generation command to a vehicle network including the vehicle control device.

In an embodiment, controlling the vehicle may include determining the MAC generation command based on at least one of a first series code including the identification code of the first target signal, a second series code including an index for determining the target code, a third series code including information about activation of the target code, or any combination thereof.

In an embodiment, controlling the vehicle may include identifying a data code other than the identification code of the first target signal from the first target signal. Controlling the vehicle may include obtaining a first authentication code, in which the data code of the first target signal is encrypted, by applying the data code and a predetermined secret key to a model trained to output information for authentication of input data. Controlling the vehicle may include determining the target code from the first authentication code based on the index included in the second series code.

In an embodiment, controlling the vehicle may include identifying a data code other than an identification code of the second target signal from the second target signal. Controlling the vehicle may include obtaining a second authentication code, in which the data code of the second target signal is encrypted, by applying the data code and the predetermined secret key to the trained model. Controlling the vehicle may include determining a temporary code from the second authentication code based on the index included in the second series code. Controlling the vehicle may include determining whether the second target signal is the signal of the vehicle control device, based on comparison between the target code and the temporary code.

In an embodiment, controlling the vehicle may include receiving the first target signal, to which the target code is combined, from the vehicle control device.

In an embodiment, controlling the vehicle may include determining a MAC stop command for the first target signal based on ignition of the vehicle being deactivated.

BRIEF DESCRIPTION OF THE DRAWINGS

The above and other objects, features, and advantages of the present disclosure should be more apparent from the following detailed description taken in conjunction with the accompanying drawings:

FIG. 7 is a diagram illustrating a MAC generation table in an autonomous driving control apparatus, according to an embodiment of the present disclosure.

Figure 1:
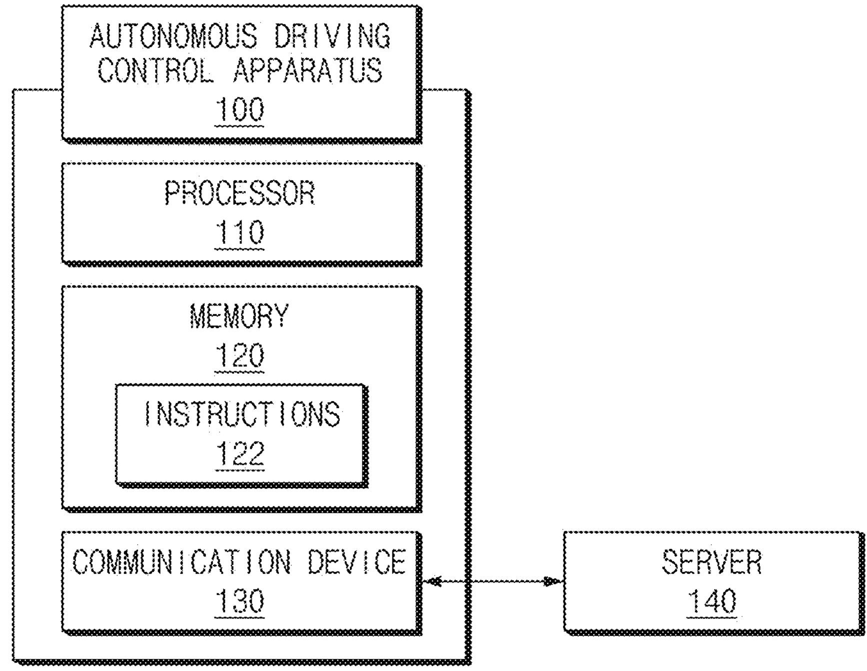
FIG. 1 is a diagram illustrating an autonomous driving control apparatus, according to an embodiment of the present disclosure.

With regard to description of drawings, the same or similar components are marked by the same or similar reference signs.

DETAILED DESCRIPTION

Hereinafter, some embodiments of the present disclosure are described in detail with reference to the accompanying drawings. When reference numerals are added to components of each drawing, it should be noted that the same or equivalent components include the same reference numerals, although the components are indicated on another drawing. Furthermore, when the embodiments of the present disclosure are described, detailed descriptions associated with well-known functions or configurations have been omitted when the detailed descriptions may make subject matters of the present disclosure unnecessarily obscure. Hereinafter, various embodiments of the present disclosure may be described with reference to accompanying drawings. Accordingly, those having ordinary skill in the art should recognize that modification, equivalent, and/or alternative on the various embodiments described herein may be variously made without departing from the scope and spirit of the present disclosure. With regard to description of drawings, similar components may be marked by similar reference numerals.

In describing elements of an embodiment of the present disclosure, the terms first, second, A, B, (a), (b), and the like may be used herein. These terms are only used to distinguish one element from another element and do not limit the corresponding elements irrespective of the nature, order, or priority of the corresponding elements. Furthermore, unless otherwise defined, all terms including technical and scientific terms used herein should be interpreted as customary in the art to which the present disclosure belongs. It should be understood that terms used herein should be interpreted as including a meaning that is consistent with their meanings in the context of the present disclosure, and the relevant art and should not be interpreted in an idealized or overly formal sense unless expressly so defined herein. For example, the terms, such as "first", "second", and the like used herein, may refer to various elements of various embodiments of the present disclosure and do not limit the elements. For example, "a first user device" and "a second user device" may indicate different user devices regardless of the order or priority thereof. For example, without departing the scope of the present disclosure, a first complement may be referred to as a second component, and similarly, a second complement may be referred to as a first complement.

In the present disclosure, the expressions, such as "possess", "may possess", "include", "comprise", "may include", and "may comprise" used herein, indicate existence of corresponding features (e.g., elements such as numeric values, functions, operations, or components) and do not exclude presence of additional features.

It should be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression, such as "configured to" used herein, may be used as, for example, the expression "suitable for", "having the capacity to", "designed to", "adapted to", "made to", or "capable of".

The term "configured to" should not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor), which performs corresponding operations by executing one or more software programs stored in a memory device. The terms used in the present disclosure are only used to describe a specific embodiment and are not intended to limit the scope of the present disclosure. The terms of a singular form may include plural forms unless otherwise specified. All the terms used herein, which include technical or scientific terms, may include the same meaning that is generally understood by a person having ordinary skill in the art. It should be further understood that terms, which are defined in a dictionary and commonly used, should also be interpreted as customary in the relevant related art and should not be in an idealized or overly formal detect unless expressly so defined herein in various embodiments of the present disclosure. In some cases, even though terms are terms defined in the present disclosure, the terms may not be interpreted to exclude embodiments of the present disclosure.

In the present disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Moreover, in describing a component of an embodiment of the present disclosure, the expressions at least one of "A or B", "at least one of A and B", "at least one of A or B", "A, B, or C", "at least one of A, B, and C", or "at least one of A, B, or C, or any combination thereof" may include any and all combinations of one or more of the associated listed items. In particular, expressions "at least one of A, B, or C, or any combination thereof" may include A, B, or C, or any combination thereof such as AB, ABC, or the like. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

Hereinafter, embodiments of the present disclosure should be described in detail with reference to FIGS. 1-8.

FIG. 1 is a diagram illustrating an autonomous driving control apparatus, according to an embodiment of the present disclosure.

An autonomous driving control apparatus 100 according to an embodiment may include a processor 110, a memory 120 including instructions 122, and a communication device 130.

The autonomous driving control apparatus 100 may refer to an apparatus that controls a vehicle. For example, the autonomous driving control apparatus 100 may control a vehicle that performs autonomous driving. The autonomous driving control apparatus 100 may determine whether signals included in a network of the vehicle are normal, to control the vehicle. For example, the autonomous driving control apparatus 100 may identify a first target signal determined from a vehicle control device. The autonomous driving control apparatus 100 may identify a second target signal, which is determined from an external control device (e.g., a control device for hacking based on an external device or unauthorized equipment) other than a control device included in a vehicle. The autonomous driving control apparatus 100 may determine whether the first target signal is an autonomous driving signal, with reference to the message authentication code (MAC) generation table. A detailed description of the MAC generation table is described in FIG. 7 below.

When the first target signal is an autonomous driving signal, the autonomous driving control apparatus 100 may compare the first target signal with a second target signal. In detail, the autonomous driving control apparatus 100 may determine the target code of the first target signal through the MAC generation command. The autonomous driving control apparatus 100 may determine a temporary code of the second target signal. The autonomous driving control apparatus 100 may determine whether the second target signal is a normal signal (i.e., a signal of the vehicle control device), based on the comparison between the target code and the temporary code. A detailed description of the target code and the temporary code is described below in FIG. 6 below.

The autonomous driving control apparatus 100 may determine whether the first target signal is an autonomous driving signal, through the MAC generation table. For example, the autonomous driving control apparatus 100 may determine whether the vehicle control device that determines the first target signal is a control device related to autonomous driving. When the vehicle control device is the control device related to autonomous driving, the autonomous driving control apparatus 100 may determine the first target signal as an autonomous driving signal. The autonomous driving control apparatus 100 may input, into the MAC generation table, information about the fact that the first target signal is an autonomous driving signal. In this way, the autonomous driving control apparatus 100 may generate the MAC generation table. Additionally, when the first target signal is an autonomous driving signal, the autonomous driving apparatus 100 control may include information about MAC generation of the first target signal in the MAC generation table.

When identifying that the vehicle's ignition is activated, the autonomous driving control apparatus 100 may generate a secret key for generating a target code of the first target signal. The autonomous driving control apparatus 100 may transmit the generated secret key to the vehicle control device. When identifying the second target signal, the autonomous driving control apparatus 100 may determine a MAC generation command for the first target signal. The autonomous driving control apparatus 100 may compare the target code determined by the MAC generation command with the temporary code.

The first target signal may indicate a signal determined by the vehicle control device. The first target signal may include pieces of information necessary for an operation related to the autonomous driving of the vehicle. On the other hand, the second target signal may indicate a signal determined by a control device different from the vehicle control device. The second target signal may include an identification code of the first target signal. However, the second target signal may include data different from data of the first target signal.

The target code may include encrypted information of the first target signal. For example, the target code may indicate a value obtained by applying the first target signal to the trained model and/or MAC generation algorithm. The temporary code may include encrypted information of the second target signal. For example, the temporary code may indicate a value obtained by applying the second target signal to the trained and/or MAC generation algorithm. A detailed description of the trained model is described below in FIG. 6 below.

The processor 110 may execute software and may control at least one other component (e.g., a hardware or software component) connected to the processor 110. The processor 110 may also perform various data processing or operations. For example, the processor 110 may store the first target signal, the second target signal, or the target code in the memory 120.

For reference, the processor 110 may perform all operations performed by the autonomous driving control apparatus 100. Accordingly, for convenience of description in the present disclosure, an operation performed by the autonomous driving control apparatus 100 are mainly described as an operation performed by the processor 110. Furthermore, for convenience of description in the present disclosure, the processor 110 is mainly described as a single processor but is limited thereto. For example, the autonomous driving not control apparatus 100 may include at least one processor. The at least one processor may perform all operations related to vehicle control operations.

The memory 120 may temporarily and/or permanently store various pieces of data and/or information required to perform the vehicle control operations. For example, the memory 120 may store the first target signal, the second target signal, or the target code.

The communication device 130 may support communication between the autonomous driving control apparatus 100 and the server 140. For example, the communication device 130 may include one or more components for communicating between the autonomous driving control apparatus 100 and the server 140. For example, the communication device 130 may include a short range wireless communication device, a microphone, or the like. In this case, short-range communication technologies include wireless LAN (Wi-Fi), Bluetooth, ZigBee, Wi-Fi Direct (WFD), ultra-wideband (UWB), infrared data association (IrDA), Bluetooth Low Energy (BLE), and near field communication (NFC), and the like but are not limited thereto.

Figure 2:
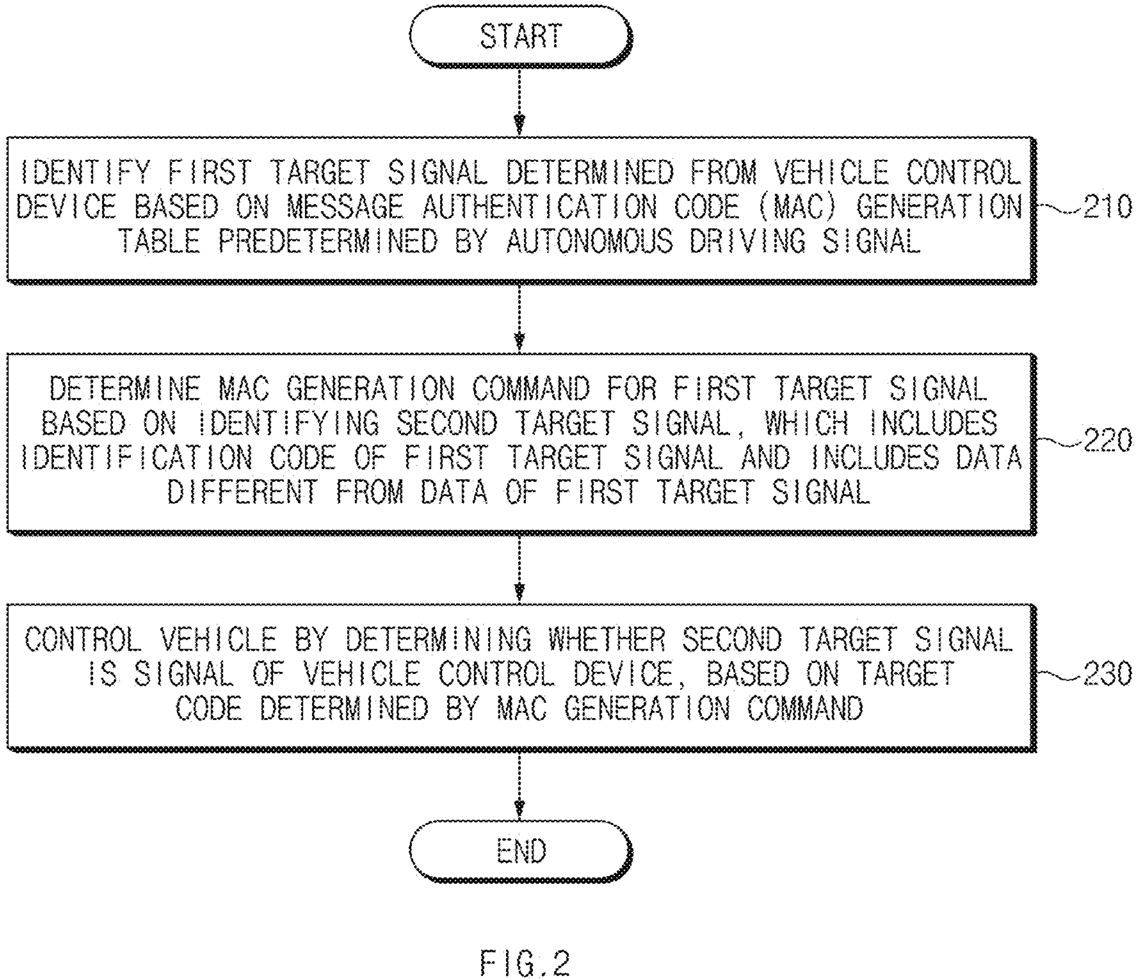
FIG. 2 is a flowchart for describing an autonomous driving control method, according to an embodiment of the present disclosure.

FIG. 2 is a flowchart for describing an autonomous driving control method, according to an embodiment of the present disclosure.

In operation 210, an autonomous driving control apparatus (e.g., the autonomous driving control apparatus 100 in FIG. 1) according to an embodiment may identify a first target signal determined from a vehicle control device based on a MAC generation table predetermined by an autonomous driving signal. For example, the vehicle control device may indicate an engine control unit (ECU) but is not limited thereto. The first target signal may include an identification code, data, and information (e.g., a target code) about MAC.

In operation 220, autonomous driving control the apparatus may determine the MAC generation command for the first target signal by identifying a second target signal, which includes an identification code of the first target signal and includes data different from data of the first target signal. For example, the MAC generation command may include information about a command for determining and/or generating the target code from the first target signal.

The second target signal may include an identification code, data, and information (e.g., a temporary code) about MAC. The second target code may include the possibility that a signal is input to the vehicle through hacking at a time point when the signal is identified by the autonomous driving control apparatus. However, the second target code may include the possibility that the signal is determined to be a normal signal (e.g., a signal determined by a vehicle control device) through the following operations.

The autonomous driving control apparatus may determine that the second target signal includes data different from data of the first target signal, based on at least one of periodicity of the second target signal, a length of the second target signal, a field value range of the second target signal, or any combination thereof. Here, when the identification code of the second target signal is different from the identification code of the first target signal, the autonomous driving control apparatus may not identify the data of the second target signal.

In operation 230, the autonomous driving control apparatus may control the vehicle by determining whether the second target signal is a signal of the vehicle control device, based on the target code determined by the MAC generation command. For example, the autonomous driving control apparatus may determine whether the second target signal is a signal of the vehicle control device, by comparing the target code of the first target signal with the temporary code of the second target signal.

Figure 3:
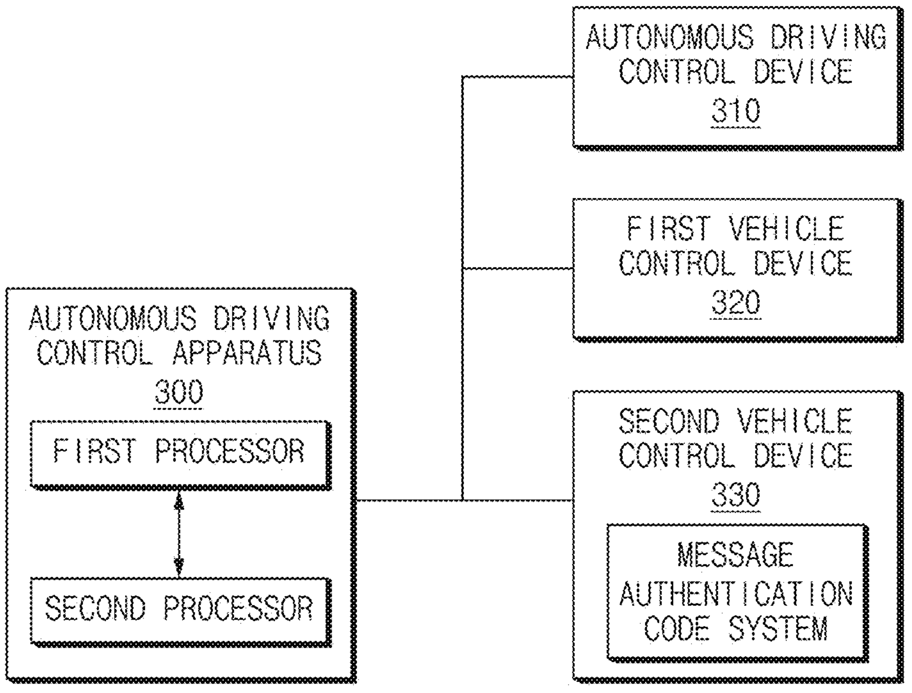
FIG. 3 is a diagram illustrating an autonomous driving control apparatus connected to a vehicle control device in an autonomous driving control apparatus, according to an embodiment of the present disclosure.

FIG. 3 is a diagram illustrating an autonomous driving control apparatus connected to a vehicle control device in an autonomous driving control apparatus, according to an embodiment of the present disclosure.

According to an embodiment, an autonomous driving control apparatus 300 according to an embodiment may include a first processor and a second processor. For example, the first processor may perform an operation of detecting abnormalities in a vehicle. In detail, the first processor may identify a first target signal and a second target signal. The first processor may compare the first target signal with the second target signal. For example, the second processor may determine a MAC generation command and may transmit the MAC generation command to a vehicle control device.

The autonomous driving control apparatus 300 may communicate with an autonomous driving control device 310, a first vehicle control device 320, and a second vehicle control device 330. For example, the autonomous driving control device 310, the first vehicle control device 320, and the second vehicle control device 330 may be included in a vehicle. The autonomous driving control device 310 may indicate a control device that performs an operation related to autonomous driving of the vehicle. The first vehicle control device 320 and the second vehicle control device 330 may indicate a control device that determines information required and/or necessary for operations related to autonomous driving of the vehicle and operations related to general driving of the vehicle. However, for convenience of description in the present disclosure, the first vehicle control device 320 may be described as a control device that determines information required and/or necessary for operations related to general driving of the vehicle. The second vehicle control device 330 may be described as a control device that determines information required and/or necessary for operations related to autonomous driving of the vehicle.

The second vehicle control device 330 may be a control device related to autonomous driving of the vehicle and may include a message authentication code system. In detail, the second vehicle control device 330 may receive the MAC generation command from the autonomous driving control apparatus 300. The second vehicle control device 330 may generate a target code (e.g., a target code in case of the first target signal or a temporary code in case of the second target signal) of a target signal by receiving the MAC generation command. However, an embodiment is not limited thereto. For example, the autonomous driving control apparatus 300 may determine the MAC generation command and may simultaneously generate the target code of the target signal.

Figure 4:
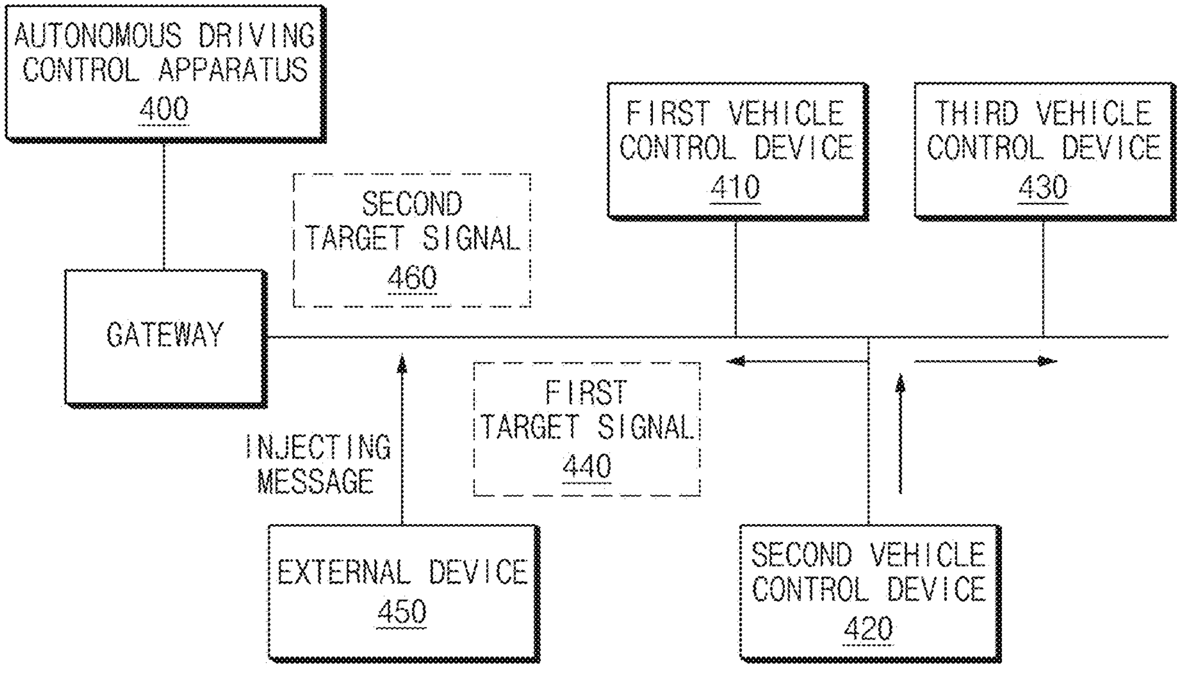
FIG. 4 is a diagram illustrating a process of identifying a first target signal and a second target signal in an autonomous driving control apparatus, according to an embodiment of the present disclosure.

FIG. 4 is a diagram illustrating a process of identifying a first target signal and a second target signal in control an autonomous driving apparatus, according to an embodiment of the present disclosure.

An autonomous driving control apparatus 400 according to an embodiment may be connected to a gateway of a vehicle. Here, the connection between the autonomous driving control apparatus 400 and the gateway may include wired and/or wireless connection.

The autonomous driving control apparatus 400 may communicate with a first vehicle control device 410, a second vehicle control device 420, and a third vehicle control device 430 through the gateway. The first vehicle control device 410, the second vehicle control device 420, and the third vehicle control device 430 may indicate control devices included in the vehicle. The autonomous driving control apparatus 400 may identify a first target signal 440 determined by the second vehicle control device 420 through the gateway.

The autonomous driving control apparatus 400 may identify a second target signal 460 injected and/or input from an external device 450 through the gateway. However, the second target signal 460 is not limited to the signal injected and/or input from the external device 450. For example, the second target signal 460 may include a signal determined by the first vehicle control device 410 and the third vehicle control device 430. Here, the external device 450 may indicate a device operated by a user (e.g., a hacker) unrelated to control of the vehicle or a device unrelated to control of the vehicle. In other words, the second target signal 460 may mean a signal intended to perform an operation of the first target signal 440 in the vehicle by including the identification code of the first target signal 440. In this case, to prevent malfunctions caused by the first target signal 440 and the second target signal 460, the autonomous driving control apparatus 400 may determine whether the second target signal 460 is a normal signal.

To determine whether the second target signal 460 is a normal signal, the autonomous driving control apparatus 400 may determine whether the first target signal is an autonomous driving signal, by applying the first target signal 440 to the MAC generation table. Here, the autonomous driving control apparatus 400 may identify the second target signal 460 based on the fact that the first target signal 440 is an autonomous driving signal. On the other hand, the autonomous driving control apparatus 400 may stop identifying the second target signal 460 based on the fact that the first target signal 440 is a different signal from the autonomous driving signal.

Figure 5:
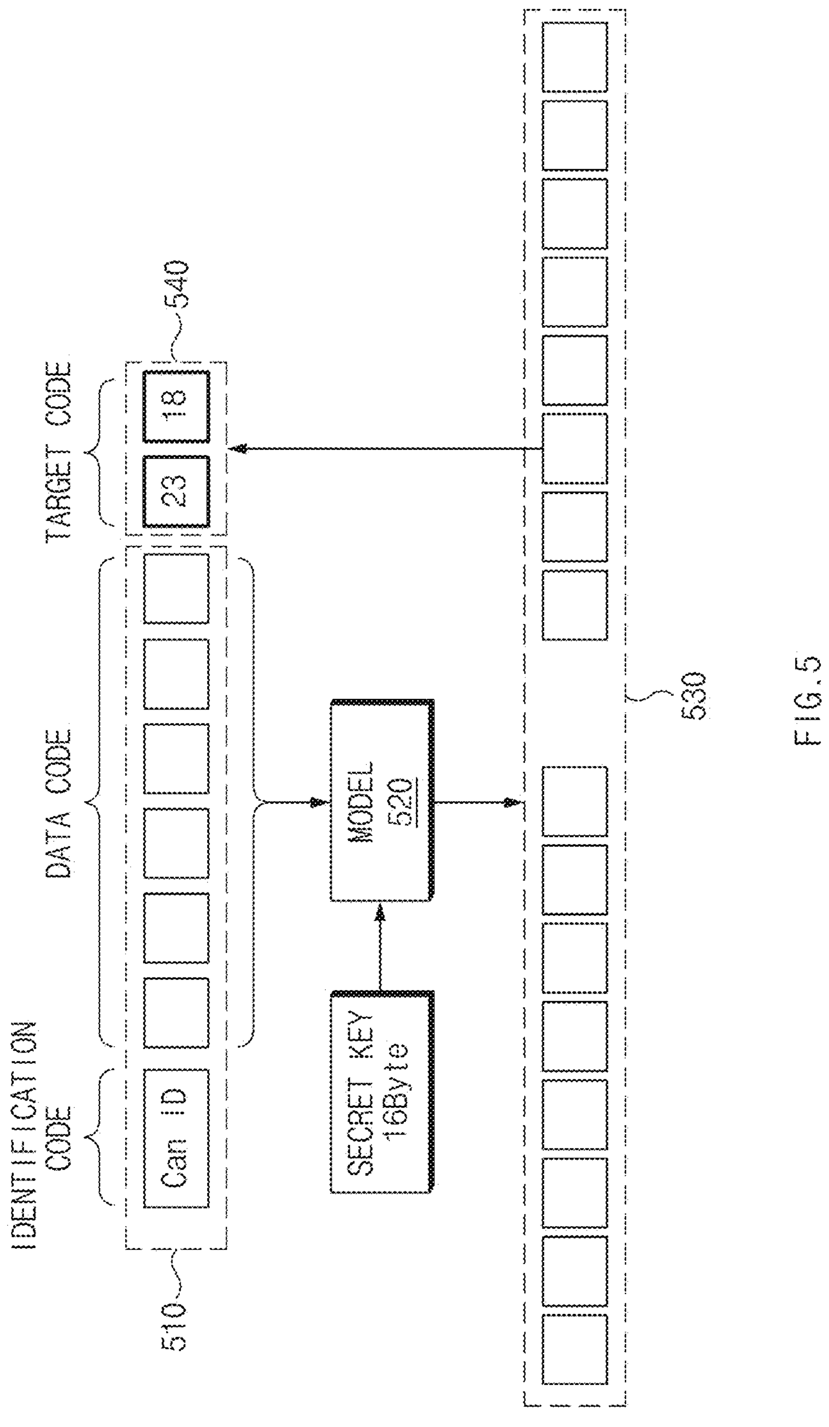
FIG. 5 is a diagram illustrating a method for determining a message authentication code (MAC) generation command in an autonomous driving control apparatus, according to an embodiment of the present disclosure.

FIG. 5 is a diagram illustrating a method for determining a MAC generation command in an autonomous driving control apparatus, according to an embodiment of the present disclosure.

An autonomous driving control apparatus (e.g., the autonomous driving control apparatus 100 in FIG. 1) according to an embodiment may identify a first target signal 510. After identifying a second target signal, the autonomous driving control apparatus may identify the permission for MAC generation of the first target signal from a MAC generation table. Based on the permission for MAC generation, the autonomous driving control apparatus may transmit and/or determine a MAC generation command to the vehicle control device.

The autonomous driving control apparatus may determine the MAC generation command based on at least one of a first series code including an identification code of the first target signal 510, a second series code including an index for determining a target code 540, a third series code including information about activation of the target code 540, or any combination thereof.

For example, the first series code may include an identification code of the first target signal 510 and information about a vehicle control device that determines the first target signal 510. The second series code may include a first index and a second index, which are indices for determining the target code 540. For example, the first index may include the index of data to be included in the target code 540 among the upper 8 bytes of a first authentication code 530. The second index may include the index of data to be included in the target code 540 among the lower 8 bytes of the first authentication code 530.

For reference, the first authentication code 530 may include information in which a data code of the first target signal 510 is encrypted. Moreover, the size of the first authentication code 530 may be changed according to predetermined settings. Accordingly, in the present disclosure, for convenience of description, the length of the first authentication code 530 is described as 16 bytes.

The autonomous driving control apparatus may identify a data code other than the identification code of the first target signal 510 from the first target signal 510. The autonomous driving control apparatus may obtain the first authentication code 530 in which the data code of the first target signal 510 is encrypted, by applying the data code and the predetermined secret key to a model 520 trained to output information for authentication of the input data. However, the method of obtaining the first authentication code 530 is not limited thereto. For example, the autonomous driving control apparatus may obtain the first authentication code 530 by applying the data code of the first target signal 510 and a predetermined secret key to the MAC generation algorithm.

Here, the method in which the autonomous driving control apparatus obtains the first authentication code 530 through the trained model 520 is described below. In particular, the autonomous driving control apparatus may train the model 520. For example, the model 520 may include a neural network. The neural network may include a plurality of layers, and each layer may include a plurality of nodes. The node may include a node value determined based on an activation function. A node on any layer may be connected to a node (e.g., another node) on another layer through a link (e.g., a connection edge) with a connection weight. The node value of a node may be propagated to other nodes through the link. In an inference operation of the neural network, node values may be forward propagated from the previous layer to the next layer.

For example, the forward propagation operation in the model 520 may indicate an operation of propagating node values based on input data in a direction from an input layer of the model 520 to an output layer of the model 520. In other words, the node value of the corresponding node may be propagated (e.g., forward propagated) to a node (e.g., the next node) of the next layer connected through the node and the connection edge. For example, the node may receive a value weighted by a connection weight from the previous node (e.g., a plurality of nodes) connected through the connection edge.

The node value of a node may be determined based on applying an activation function to the sum (e.g., weighted sum) of weighted values received from previous nodes. For example, a parameter of a neural network may include the connection weight described above. The parameters of the neural network may be updated such that a value of an objective function value r changes in a targeted direction (e.g., a described direction in which a loss is minimized).

The trained model 520 may indicate a trained model through machine learning. The trained model 520 may be a trained machine learning model that outputs a training output (e.g., an authentication code) from a training input (e.g., the data code and the secret key). The machine learning model (e.g., the trained model 520) may be created through machine learning. For example, the learning algorithm may include supervised learning, unsupervised learning, semi-supervised learning, or reinforcement learning but is not limited to the above example.

In the case of supervised learning, the above-described model 520 may be trained by training data including pairs of the training input and the training output mapped to the training input. For example, the machine learning model may be trained to output the training output from the training input. The machine learning model during training may generate a temporary output in response to the training input. The machine learning model during training may be trained such that the loss between the temporary output and the training output (e.g., a training target) is minimized. During a training process, a parameter (e.g., a connection weight between nodes/layers in a neural network) of the machine learning model may be updated based on the loss. For example, this training may be performed by the autonomous driving control apparatus itself where the machine learning model is performed, and this training may be performed through a separate server. The machine learning model (e.g., the trained model 520) in which training is completed may be stored in a memory (e.g., the memory 120 in FIG. 1).

By obtaining the first authentication code 530, the autonomous driving control apparatus may determine the target code 540 from the first authentication code 530, based on an index included in the second series code. For example, when the first authentication code 530 includes '24', '52', '23', '66', '84', '44', '13', '94', '75', '10', '53', '18', '47', '85', '62', and '74', the first index is '3', and the second index is '4', the autonomous driving control apparatus may determine the target code 540, which includes '23' and '18', from the first authentication code 530.

Figure 6:
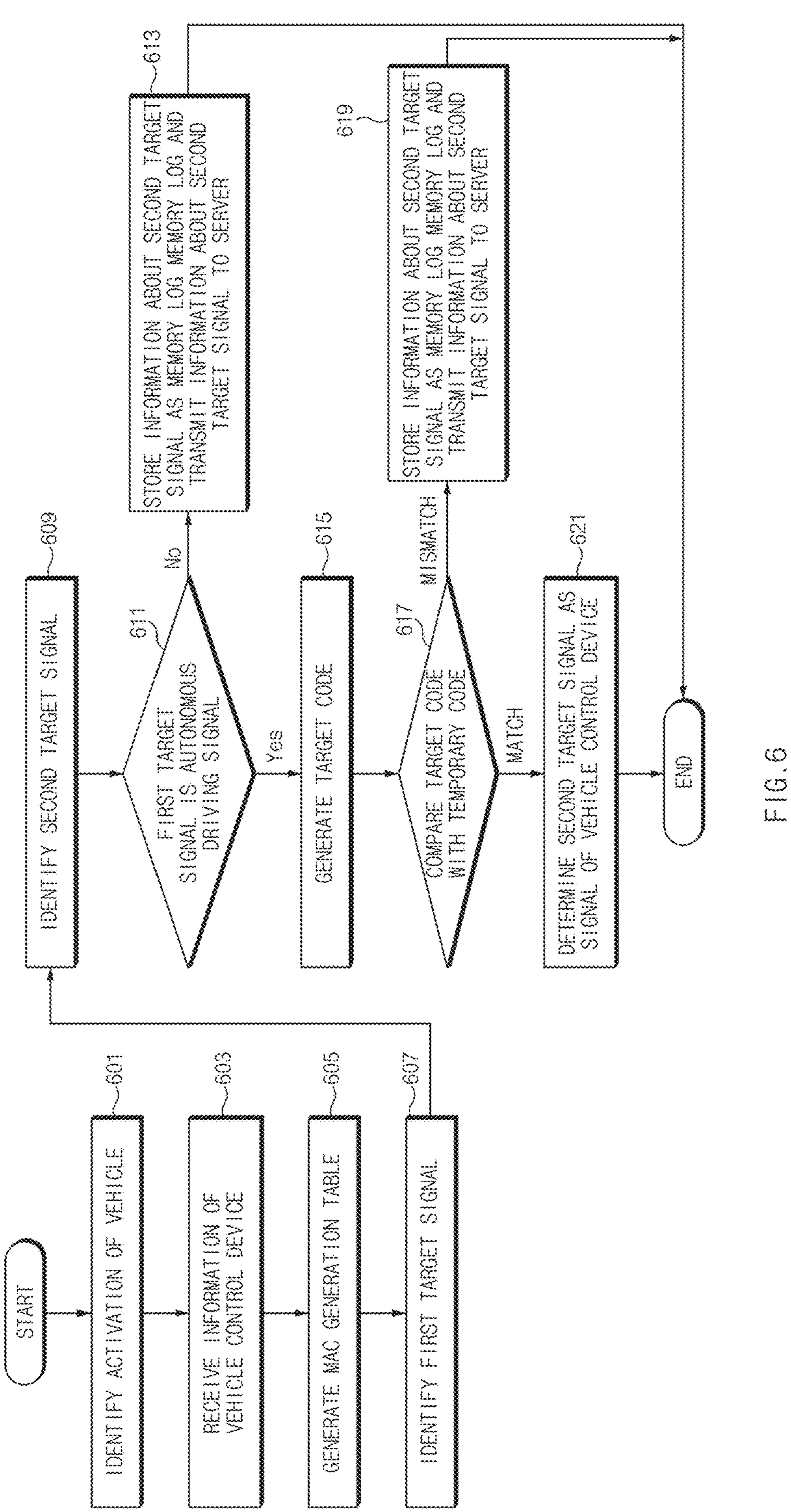
FIG. 6 is a flowchart for describing a method of controlling a vehicle in an autonomous driving control apparatus, according to an embodiment of the present disclosure.

FIG. 6 is a flowchart for describing a method of controlling a vehicle in an autonomous driving control apparatus, according to an embodiment of the present disclosure.

In operation 601, an autonomous driving control apparatus (e.g., the autonomous driving control apparatus 100 in FIG. 1) according to an embodiment may identify activation of a vehicle. For example, when the vehicle's ignition is activated, the autonomous driving control apparatus may determine that the vehicle's state is active.

In operation 603, the autonomous driving control apparatus may receive information of a vehicle control device. For example, the autonomous driving control apparatus may receive information (e.g., controller area network (CAN) ID information) of the control device regarding autonomous driving through the gateway.

In operation 605, the autonomous driving control apparatus may generate a MAC generation table. In operation 607, the autonomous driving control apparatus may identify a first target signal. In operation 609, the autonomous driving control apparatus may identify a second target signal.

In operation 611, the autonomous driving control apparatus may determine whether the first target signal is an autonomous driving signal. For example, after identifying a second target signal, the autonomous driving control apparatus may identify the permission for MAC generation of the first target signal from the MAC generation table. The autonomous driving control apparatus may determine to transmit a MAC generation command to the vehicle control device, based on the permission for MAC generation. Here, the autonomous driving control apparatus may perform broadcasting of the MAC generation command to a vehicle network including the vehicle control device.

In operation 613, the autonomous driving control apparatus may store information about the second target signal as a memory log, when the first target signal is not an autonomous driving signal (No in operation 611). In addition, the autonomous driving control apparatus may transmit the information about the second target signal to a server.

In operation 615, the autonomous driving control apparatus may generate a target code when the first target signal is an autonomous driving signal (Yes in operation 611). For example, the autonomous driving control apparatus may directly generate the target code. Furthermore, the autonomous driving control apparatus may receive the target code from the vehicle control device by transmitting the MAC generation command to the vehicle control device. In this case, the autonomous driving control apparatus may receive the first target signal, to which the target code is combined, from the vehicle control device. A method in which the autonomous driving control apparatus generates the target code is described in FIG. 5, and thus descriptions about the method have been omitted in FIG. 6 to avoid redundancy.

In operation 617, the autonomous driving control apparatus may compare the target code with a temporary code to determine whether the target code is matched with the temporary code. For example, the autonomous driving control apparatus may identify a data code, which excludes the identification code of the second target signal, from the second target signal. The autonomous driving control apparatus may obtain a second authentication code in which the data code of the second target signal is encrypted, by applying the data code of the second target signal and a secret key to the trained model. The autonomous driving control apparatus may determine a temporary code from the second authentication code based on an index included in the second series code. The autonomous driving control apparatus may determine whether the second target signal is a signal of the vehicle control device, based on the comparison between the target code and the temporary code.

In operation 619, the autonomous driving control apparatus may store information about the second target signal as a memory log when the target code is different from the temporary code (MISMATCH in operation 617). In addition, the autonomous driving control apparatus may transmit the information about the second target signal to a server.

In operation 621, the autonomous driving control apparatus may determine the second target signal as the signal of the vehicle control device, when the target code is the same as the temporary code (MATCH in operation 617). Then, the autonomous driving control apparatus may determine the MAC stop command for the first target signal based on the vehicle's ignition being deactivated. The autonomous driving control apparatus may control the vehicle through the operations described in operations 601 to 621.

FIG. 7 is a diagram illustrating a MAC generation table in an autonomous driving control apparatus, according to an embodiment of the present disclosure.

Referring to FIG. 7, an autonomous driving control apparatus (e.g., the autonomous driving control apparatus 100 in FIG. 1) according to an embodiment may identify a first target signal based on a MAC generation table 700. For example, the MAC generation table 700 may include a vehicle control device, an identification code, an autonomous driving signal, and a MAC group. In detail, referring to an area 710 including information about a second vehicle control device, the second vehicle control device may determine two target signals including different identification codes from each other. For example, the first target signal (e.g., identification code CAN ID #2) of the second vehicle control device is an autonomous driving signal and is included in the MAC group at the same time. On the other hand, the second target signal (e.g., identification code CAN ID #3) of the second vehicle control device is not the autonomous driving signal and is not included in the MAC group.

The autonomous driving control apparatus may identify one of the first target signal of the second vehicle control device and the second target signal of the second vehicle control device as a first target signal. When the autonomous driving control apparatus identifies the first target signal of the second vehicle control device as the first target signal, the autonomous driving control apparatus may identify the second target signal. On the other hand, when the autonomous driving control apparatus identifies the second target signal of the second vehicle control device as the first target signal, the autonomous driving control apparatus may stop identifying the second target signal.

Figure 8:
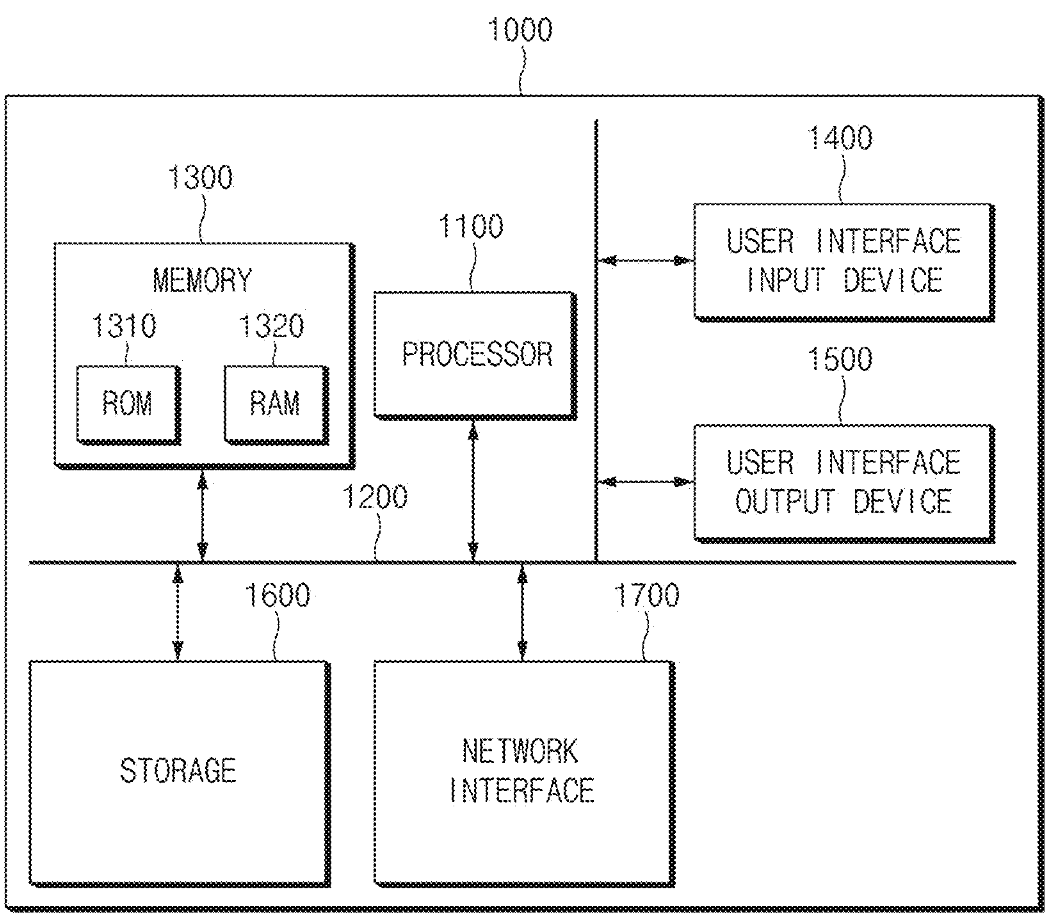
FIG. 8 is a diagram illustrating a computing system related to an autonomous driving control apparatus or a control method thereof, according to an embodiment of the present disclosure.

FIG. 8 is a diagram illustrating a computing system related to an autonomous driving control apparatus or a control method thereof, according to an embodiment of the present disclosure.

Referring to FIG. 8, a computing system 1000 related to an autonomous driving control apparatus or a control method thereof may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments disclosed in the present disclosure may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM) 1320, a flash memory, a read only memory (ROM) 1310, an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one having ordinary skill in the art without departing from the essential characteristic of the present disclosure.

The above-described embodiments may be implemented with hardware elements, software elements, and/or a combination of hardware elements and software elements. For example, the devices, methods, and components described in embodiments of the present disclosure may be implemented by using general-use computers or special-purpose computers, such as a processor, a controller, an arithmetic logic unit (ALU), a digital signal processor, a microcomputer, a field programmable array (FPA), a programmable logic unit (PLU), a microprocessor, or any device which may execute instructions and respond. A processing device may perform an operating system (OS) or a software application running on the OS. Further, the processing device may access, store, manipulate, process and generate data in response to execution of software. It should be understood by those having ordinary skill in the art that although a single processing device may be illustrated for convenience of understanding, the processing device may include a plurality of processing elements and/or a plurality of types of processing elements. For example, the processing device may include a plurality of processors or one processor and one controller. Also, the processing device may include a different processing configuration, such as a parallel processor.

Software may include computer programs, codes, instructions, or one or more combinations thereof and may configure a processing device to operate in a desired manner or independently or collectively control the processing device. Software and/or data may be permanently or temporarily embodied in any type of machine, components, physical equipment, virtual equipment, computer storage media or units, or transmitted signal waves so as to be interpreted by the processing device or to provide instructions or data to the processing device. Software may be dispersed throughout computer systems connected over networks and be stored or executed in a dispersion manner. Software and data may be recorded in a computer-readable storage medium.

The methods according to the above-described embodiments may be recorded in a computer-readable medium including program instructions that are executable through various computer devices. The computer-readable medium may also include program instructions, data files, data structures, and the like, singly or in combination. The program instructions recorded in the medium may be designed and configured specially for the embodiments of the present disclosure or may be known and available to those having ordinary skill in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like.

The hardware device described above may be configured to act as one or more software modules to perform the operations of the above-described embodiments of the present disclosure, or vice versa.

Even though the embodiments are described with reference to restricted drawings, it may be apparently to one having ordinary skill in the art that the embodiments are variously changed or modified based on the above description. For example, adequate effects may be achieved even when the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Descriptions of an autonomous driving control apparatus according to an embodiment of the present disclosure and a control method thereof are as follows.

According to at least one of embodiments of the present disclosure, it is possible to reduce the amount of computation of control devices that apply MAC to a signal by identifying a target signal determined from a vehicle control device based on an MAC generation table predetermined by an autonomous driving signal.

Moreover, according to at least one of embodiments of the present disclosure, it is possible to increase the accuracy of determination about abnormalities of a vehicle by determining a MAC generation command for the target signal based on identifying an external signal, which includes an identification code of the target signal and includes data different from data of the target signal.

Furthermore, according to at least one of embodiments of the present disclosure, it is possible to increase the communication security of a vehicle performing autonomous driving by controlling a vehicle including a vehicle control device by determining whether the external signal is a signal of the vehicle control device, based on a target code determined by the MAC generation command.

Besides, a variety of effects directly or indirectly understood through the present disclosure may be provided.

Hereinabove, although the present disclosure was described with reference to embodiments and the accompanying drawings, the present disclosure is not limited thereto but May be variously modified and altered by those having ordinary skill in the art to which the present disclosure pertains without departing from the spirit and scope of the present disclosure claimed in the following claims.

What is claimed is:

1. An autonomous driving control apparatus comprising:
a memory configured to store computer-executable instructions; and
at least one processor configured, when executing the computer-executable instructions by accessing the memory, to
identify a first target signal determined from a vehicle control device based on a message authentication code (MAC) generation table predetermined by an autonomous driving signal,
determine a MAC generation command for the first target signal by identifying a second target signal, wherein the second target signal includes an identification code of the first target signal and includes data different from data of the first target signal, and
control a vehicle including the vehicle control device by determining whether the second target signal is a signal of the vehicle control device, based on a target code determined by the MAC generation command.

2. The autonomous driving control apparatus of claim 1, wherein the at least one processor is configured to:
determine whether the first target signal is the autonomous driving signal, by applying the first target signal to the MAC generation table;
identify the second target signal based on the first target signal being the autonomous driving signal; and
stop identifying the second target signal based on the first target signal being a different signal from the autonomous driving signal.

3. The autonomous driving control apparatus of claim 1, wherein the at least one processor is configured to:
determine that the second target signal includes data different from data of the first target signal, based on at least one of periodicity of the second target signal, a length of the second target signal, a field value range of the second target signal, or any combination thereof.

4. The autonomous driving control apparatus of claim 1, wherein the at least one processor is configured to:
identify permission for MAC generation of the first target signal from the MAC generation table after identifying the second target signal; and
transmit the MAC generation command to the vehicle control device, based on the permission for MAC generation.

5. The autonomous driving control apparatus of claim 4, wherein the at least one processor is configured to:
broadcast the MAC generation command to a vehicle network including the vehicle control device.

6. The autonomous driving control apparatus of claim 1, wherein the at least one processor is configured to:
determine the MAC generation command based on at least one of a first series code including the identification code of the first target signal, a second series code including an index for determining the target code, a third series code including information about activation of the target code, or any combination thereof.

7. The autonomous driving control apparatus of claim 6, wherein the at least one processor is configured to:
identify a data code other than the identification code of the first target signal from the first target signal;
obtain a first authentication code, in which the data code of the first target signal is encrypted, by applying the data code and a predetermined secret key to a model trained to output information for authentication of input data; and
determine the target code from the first authentication code based on the index included in the second series code.

8. The autonomous driving control apparatus of claim 7, wherein the at least one processor is configured to:
identify a data code other than an identification code of the second target signal from the second target signal;
obtain a second authentication code, in which the data code of the second target signal is encrypted, by applying the data code and the predetermined secret key to the trained model;
determine a temporary code from the second authentication code based on the index included in the second series code; and
determine whether the second target signal is the signal of the vehicle control device, based on comparison between the target code and the temporary code.

9. The autonomous driving control apparatus of claim 1, wherein the at least one processor is configured to:
receive the first target signal, to which the target code is combined, from the vehicle control device.

10. The autonomous driving control apparatus of claim 1, wherein the at least one processor is configured to:
determine a MAC stop command for the first target signal based on ignition of the vehicle being deactivated.

11. An autonomous driving control method, the method comprising:
identifying a first target signal determined from a vehicle control device based on a message authentication code (MAC) generation table predetermined by an autonomous driving signal;
determining a MAC generation command for the first target signal by identifying a second target signal, wherein the second target signal includes an identification code of the first target signal and includes data different from data of the first target signal; and
controlling a vehicle including the vehicle control device by determining whether the second target signal is a signal of the vehicle control device, based on a target code determined by the MAC generation command.

12. The method of claim 11, wherein controlling the vehicle includes:
determining whether the first target signal is the autonomous driving signal, by applying the first target signal to the MAC generation table;
identifying the second target signal based on the first target signal being the autonomous driving signal; and
stopping identifying the second target signal based on the first target signal being a different signal from the autonomous driving signal.

13. The method of claim 11, wherein controlling the vehicle includes:
determining that the second target signal includes data different from data of the first target signal, based on at least one of periodicity of the second target signal, a length of the second target signal, a field value range of the second target signal, or any combination thereof.

14. The method of claim 11, wherein controlling the vehicle includes:

identifying permission for MAC generation of the first target signal from the MAC generation table after identifying the second target signal; and transmitting the MAC generation command to the vehicle control device, based on the permission for MAC generation.

15. The method of claim 14, wherein controlling the vehicle includes:

broadcasting the MAC generation command to a vehicle network including the vehicle control device.

16. The method of claim 11, wherein controlling the vehicle includes:

determining the MAC generation command based on at least one of a first series code including the identification code of the first target signal, a second series code including an index for determining the target code, a third series code including information about activation of the target code, or any combination thereof.

17. The method of claim 16, wherein controlling the vehicle includes:

identifying a data code other than the identification code of the first target signal from the first target signal;

obtaining a first authentication code, in which the data code of the first target signal is encrypted, by applying the data code and a predetermined secret key to a model trained to output information for authentication of input data; and determining the target code from the first authentication code based on the index included in the second series code.

18. The method of claim 17, wherein controlling the vehicle includes:

identifying a data code other than an identification code of the second target signal from the second target signal;

obtaining a second authentication code, in which the data code of the second target signal is encrypted, by applying the data code and the predetermined secret key to the trained model;

determining a temporary code from the second authentication code based on the index included in the second series code; and determining whether the second target signal is the signal of the vehicle control device, based on comparison between the target code and the temporary code.

19. The method of claim 11, wherein controlling the vehicle includes:

receiving the first target signal, to which the target code is combined, from the vehicle control device.

20. The method of claim 11, wherein controlling the vehicle includes:

determining a MAC stop command for the first target signal based on ignition of the vehicle being deactivated.

* * * * *